May 11, 1943.   B. W. SEWELL   2,318,720
MAGNETIC PERMEABILITY INDICATOR
Filed Nov. 12, 1940

Benjamin W. Sewell, INVENTOR.
BY P. J. Whelan

Patented May 11, 1943

2,318,720

UNITED STATES PATENT OFFICE 2,318,720

MAGNETIC PERMEABILITY INDICATOR

Benjamin W. Sewell, Tulsa, Okla., assignor to Standard Oil Development Company, a corporation of Delaware Application November 12, 1940, Serial No. 365,181

4 Claims. (Cl. 175—183)

The present invention is directed to an indicating device which is useful in determining when the magnetic permeability of a metal reaches a predetermined value. More particularly, it is useful in determining when a weld may be quenched.

It has been ascertained that when steel is welded structural changes occur in the steel during cooling which must be taken under consideration before the weld is quenched. A critical point is reached above which quenching would be dangerous and below which quenching is safe. It has been found that there is a change in the magnetic permeability of the weld, and that this change is sharp at the aforesaid critical point. Accordingly, the technique has been developed of observing the magnetic permeability of the weld during its cooling so as to ascertain when quenching is safe.

The principal object of the present invention is the provision of a simple handy device which may be pressed against the weld to be observed and which will give a signal when the critical point is reached.

More particularly, an object of the present invention is the provision of such a device in a fountain pen shape.

A further object of the present invention is the provision in a device of the character described of a signal arranged in an electrical circuit having a switch associated with a magnetic circuit which switch is adapted to be opened when the magnetic circuit is in contact with the metal under observation when the magnetic permeability of said metal reaches a predetermined value.

Further objects and advantages of the present invention will appear from the drawing in which—

Figure 1:
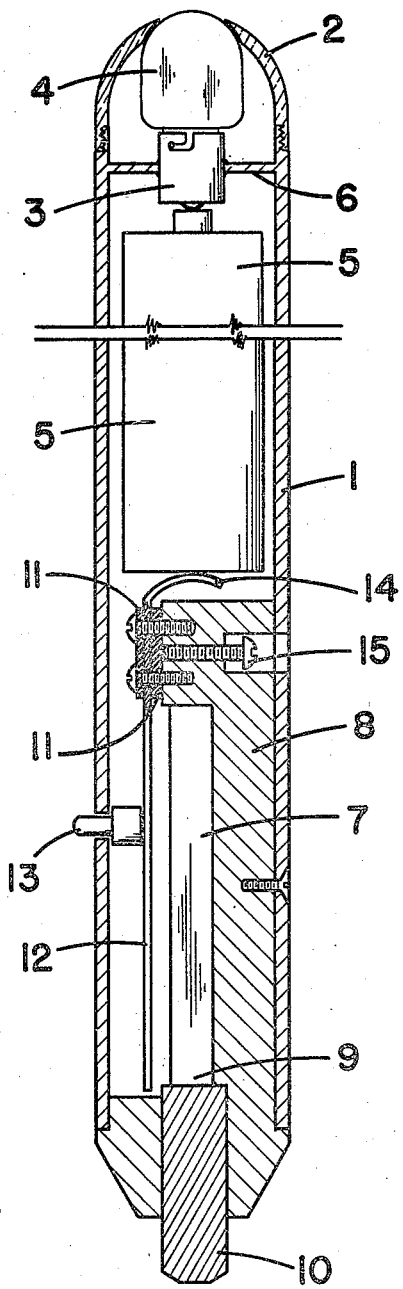
Fig. 1 is a longitudinal section of one embodiment of the present invention.

Referring to the drawing in detail, numeral 1 designates a metal case preferably in the form of a fountain pen. Screwed into one end of the casing is a cap 2 overlying a socket 3 adapted to hold an ordinary light bulb 4 in contact with one terminal of a battery 5. A transverse member 6 is also provided for making contact between the bulb socket 3 and the wall of the casing.

In the other end of the casing is mounted a permanent magnet 7, held in place by a brass bracket 8. One pole 9 abuts a soft iron core 10 which protrudes from the end of said magnet of bracket 8 and is adapted to be placed in contact with the metal whose magnetic permeability is to be tested. Secured to the bracket 8 and insulated therefrom by the insulating disks 11, is a spring arm 12 which is of such a length that its free end can be pressed against the inner end of soft iron piece 10. A button 13, protruding through the casing 1, is provided for pressing the free end of arm 12 against the core 10. The other end of the spring arm protrudes beyond the inner end of bracket 8 in the form of a curved finger 14, which is adapted to contact the other terminal of the battery 5.

The tension of the spring 12 is so adjusted by screw 15 that the magnetism of the permanent magnet is sufficient to hold the free end thereof on the soft iron core 10. When in this position the light circuit is closed and the light is on. When any magnetic material is then brought into the field of the magnet, as by pressing the soft core piece 10 against a metal, the attractive power of the permanent magnet for the spring becomes less than the spring tension thereby causing the spring to pull away from the magnet and open the electric circuit, indicating, by the extinguishing of the light, that the magnetic permeability of the piece being tested has a certain value. By properly adjusting the spring tension the magnetic switch can be made to open when a specimen of steel has a given magnetic permeability. In practice the tension of the spring 12 is so adjusted that when the magnetic permeability of a weld reaches that value characteristic of the critical point during the cooling of the steel, the contact between the spring and the magnet will be broken. Thus, in the use of the device, after the weld is completed, the operator simply presses pole member 10 against the weld and watches the light. When the light goes out it is safe to quench the weld.

Figure 2:
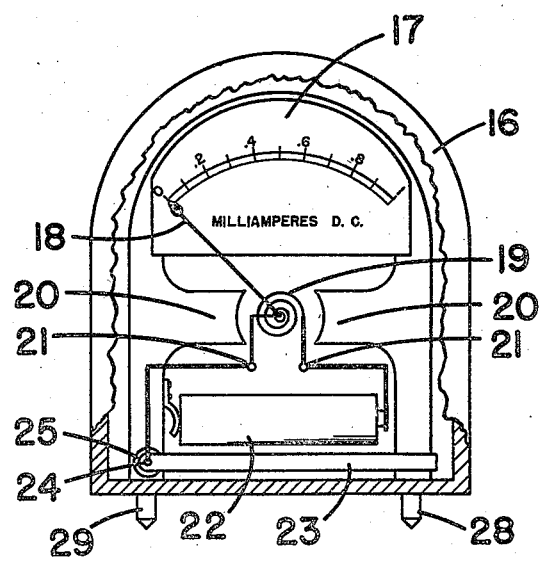
Fig. 2 is a plan view of another embodiment of the present invention with the front face broken away.
Figure 3:
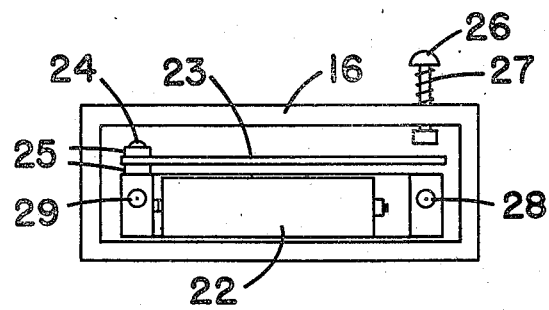
Fig. 3 is an end view of Figure 2 with bottom cover removed.

The embodiment shown in Fig. 2 is a flat meter having a case 16 of conventional shape in which is a window through which may be observed a scale 17, across which is adapted to move a hand 18 connected to the moving coil 19, mounted between the poles 20 of a magnet. The terminals 21 of the coil are connected to a battery 22 through a switch which comprises a spring arm 23 having one of its ends fixed to and insulated from one pole of the magnet by a bolt 24 and insulating disk 25 and having its other end overlying the other pole of the magnet. Extending through the casing and adapted to work on the free end of the spring 23 is a button 26 normally spring pressed outwardly by a spring 27. The terminals of the magnet are provided with probes 28 and 29 adapted to be placed against the metal to be tested. Actually only one of these probes is necessary, namely, 28.

In the use of this instrument the free end of the spring member 23 is pressed downwardly on the magnet by the button 26, and is held in place by the magnetism. When this is done the current of the battery is passed through the coil 19 and causes the hand 18 to deflect to a fixed point. Then when the probe 28 is placed against the metal, the magnetic permeability of which is to be examined, and that permeability reaches a certain value, the magnetic lines of force, instead of passing through the spring arm 23 tend to follow the easier path through the metal to be tested, with the result that the tension of the spring arm 23 overcomes the magnetic attraction of the magnet for the free end of the spring arm and the latter springs away, opening the electrical circuit with the result that the needle goes back to zero.

It will be apparent that a number of modified forms of this invention are conceivable without departing from the scope of the present invention or the basic principle of having an electrical circuit operate an indicating device and normally held in closed position by a magnetic switch which is adapted to open when a piece to be tested has a predetermined magnetic permeability.

The nature and objects of the present invention having been thus described and illustrated, what is claimed as new and useful and is desired to be secured by Letters Patent is:

1. A hand device for testing welds comprising a tubular casing, a permanent magnet mounted in said casing, an outlet for the flux of said magnet extending from one end of said casing to one pole of said magnet and adapted to be placed against the weld to be tested, a signalling device mounted within said casing, an electrical circuit for operating said signaling device, and a switch in said circuit including a spring arm adapted to be held in closed position by said magnet and to open upon the leakage of magnetic flux from said magnet.

2. A hand device for testing welds comprising a tubular casing, a permanent bar magnet longitudinally mounted in said casing, a soft iron core exposed at one end of said casing and extending to one pole of said magnet, a signaling device mounted within said casing, an electrical circuit for operating said signaling device, and a switch in said circuit including a spring arm having a free end arranged adjacent said pole of the magnet and adapted to be held in closed position by said magnet and to open upon the leakage of magnetic flux from said magnet.

3. A device in accordance with claim 1 in which a means is provided for readily adjusting the bias of said spring arm when the switch is closed.

4. A device in accordance with claim 2 in which a means is provided for readily adjusting the bias of said spring arm when the switch is closed.

BENJAMIN W. SEWELL.